(12) United States Patent
Hu et al.

(10) Patent No.: US 10,146,660 B2
(45) Date of Patent: *Dec. 4, 2018

(54) PROVIDING DATA TO A USER INTERFACE FOR PERFORMANCE MONITORING

(71) Applicant: International Business Machines Corporation, Armonk, NY (US)

(72) Inventors: Xiao Wei Hu, Beijing (CN); Cheng Quan Li, Beijing (CN); Ru Xing Xiao, Beijing (CN); Yue Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/072,267

(22) Filed: Mar. 16, 2016

(65) Prior Publication Data

US 2016/0196199 A1    Jul. 7, 2016

Related U.S. Application Data

(63) Continuation of application No. 13/902,586, filed on May 24, 2013, now Pat. No. 9,304,931.

(30) Foreign Application Priority Data

May 25, 2012    (CN) .......................... 2012 1 0166886

(51) Int. Cl.
*G06F 12/00* (2006.01)
*G06F 11/34* (2006.01)
(Continued)

(52) U.S. Cl.
CPC ............ *G06F 11/3495* (2013.01); *G06F 9/54* (2013.01); *G06F 11/324* (2013.01); *G06F 11/3466* (2013.01); *G06F 12/0868* (2013.01); *G06F 12/0871* (2013.01); *G06F 2212/1041* (2013.01); *G06F 2212/281* (2013.01)

(58) Field of Classification Search
None
See application file for complete search history.

(56) References Cited

U.S. PATENT DOCUMENTS 6,505,246 B1    1/2003  Land et al.
6,988,095 B1    1/2006  Dorfman
(Continued)

FOREIGN PATENT DOCUMENTS

CN          1953540        4/2007
CN         101179647       5/2008

OTHER PUBLICATIONS

U.S. Patent Application, dated May 24, 2013, for U.S. Appl. No. 13/902,586, filed May 24, 2013, invented by Xiao Wei Hu et al., Total 20 pages.

(Continued)

*Primary Examiner* — Daniel D Tsui
(74) *Attorney, Agent, or Firm* — Rabindranath Dutta; Konrad, Raynes, Davda and Victor LLP

(57) ABSTRACT

A method, system, and computer readable storage medium for providing data to a user interface for performance monitoring are disclosed, in which an a data definition is acquired, where the data definition is generated in response to a definition of the user interface. Data is acquired from data sources based on the data definition. The acquired data is processed based on the data definition, and the processed data is cached.

20 Claims, 3 Drawing Sheets

(51) Int. Cl.
    *G06F 12/0871* (2016.01)
    *G06F 9/54* (2006.01)
    *G06F 11/32* (2006.01)
    *G06F 12/0868* (2016.01)

(56) References Cited

U.S. PATENT DOCUMENTS

| | | |
|---|---|---|
| 2002/0085033 A1 | 7/2002 | Robinson et al. |
| 2004/0027377 A1 | 2/2004 | Hays et al. |
| 2005/0057560 A1 | 3/2005 | Bibr et al. |
| 2005/0193361 A1 | 9/2005 | Vitanov et al. |
| 2007/0159643 A1 | 7/2007 | Bennetto et al. |
| 2007/0174852 A1 | 7/2007 | Smirnov et al. |
| 2010/0115443 A1 | 5/2010 | Richstein |
| 2010/0241978 A1 | 9/2010 | Genovese et al. |
| 2011/0119605 A1 | 5/2011 | Jayadevan et al. |

OTHER PUBLICATIONS

Office Action, dated Apr. 28, 2015, for U.S. Appl. No. 13/902,586, filed May 24, 2013, invented by Xiao Wei Hu et al., Total 13 pages.

Response to Office Action, dated Jul. 28, 2015, for U.S. Appl. No. 13/902,586, filed May 24, 2013, invented by Xiao Wei Hu et al., Total 12 pages.

Final Office Action, dated Oct. 8, 2015, for U.S. Appl. No. 13/902,586, filed May 24, 2013, invented by Xiao Wei Hu et al., Total 8 pages.

Response to Final Office Action, dated Dec. 8, 2015, for U.S. Appl. No. 13/902,586, filed May 24, 2013, invented by Xiao Wei Hu et al., Total 9 pages.

Notice of Allowance, dated Jan. 4, 2016, for U.S. Appl. No. 13/902,586, filed May 24, 2013, invented by Xiao Wei Hu et al., Total 5 pages.

Office Action, dated Feb. 27, 2017, for U.S. Appl. No. 15/072,236, filed Mar. 16, 2016, invented by Xiao Wei Hu et al., Total 19 pages.

U.S. Patent Application, dated Mar. 16, 2016, for U.S. Appl. No. 15/072,236 (37.308C1), filed Mar. 16, 2016, invented by Xiao Wei Hu et al., Total 22 pages.

Information Materials for IDS, dated Dec. 30, 2015, Total 4 pages.

Chinese Office Action, dated Dec. 29, 2015, for International Application No. CN920120044CN1, Total 6 pages.

Machine Translation for Application No. CN101179647A, published May 14, 2008, Total 26 pages.

Response dated May 23, 2017, pp. 3, to Office Action dated Feb. 27, 2017, pp. 19, for U.S. Appl. No. 15/072,236, filed Mar. 16, 2016.

Notice of Allowance dated Sep. 12, 2017, pp. 7, for U.S. Appl. No. 15/072,236, filed Mar. 16, 2016.

PROVIDING DATA TO A USER INTERFACE FOR PERFORMANCE MONITORING

CROSS-REFERENCE TO RELATED FOREIGN APPLICATION

This application is a continuation of application Ser. No. 13/902,586 filed on May 24, 2013, wherein application Ser. No. 13/902,586 is a non-provisional application that claims priority benefits under Title 35, United States Code, Section 119(a)-(d) from Chinese Patent Application entitled "METHOD AND SYSTEM FOR PROVIDING DATA TO A USER INTERFACE FOR PERFORMANCE MONITORING (English Translation)" by Xiao Wei HU, Cheng Quen LI, Ru Xing XIAO, and, Yue CHEN having Chinese Patent Application Serial No. 201210166886.8, filed on May 25, 2012, which Chinese Patent Application and application Ser. No. 13/902,586 are incorporated herein by reference in their entirety.

BACKGROUND

1. Field

Embodiments relate to the computer field, and more specifically, to a method, system, and computer readable storage medium for providing data to a user interface for performance monitoring.

2. Background

Currently, there is often a need to determine the performance of an application and usage status of relevant resources during the running of an application system, i.e., there is a need to monitor performance of the application system. As complexity of the application system and components thereof increases, one application may involve thousands of performance related running indices; however, a large amount of system resources is often needed to collect and display data related to all of the running indices, and this may affect normal operation of the application system.

For a certain specific application in the application system, a manager may need to find out and continually monitor the most interested running index to ensure that the running status of the application system can be known at any time, such that any problems that occur may be handled in time. Furthermore, a manager often needs to aggregate data related to several running indices of the application system so as to extract summarized data that reflects the running status of the application system. Currently, when performance monitoring is conducted on an application system, a method employed may directly extract data related to running indices through a user interface during operation of the application and then calculate the desired running indices according to the extracted data. However, such a method may cause display speed to be slowed as the complexity of the application system and the calculation complexity increases.

SUMMARY OF THE PREFERRED EMBODIMENTS

Provided are a method, system, and computer readable storage medium for providing data to a user interface for performance monitoring, comprising: acquiring data definition, where the data definition is generated in response to definition of the user interface; acquiring data from data sources based on the data definition; processing the acquired data based on the data definition; and caching the processed data.

According to another embodiment, there is provided a system for providing data to a user interface for performance monitoring, comprising: a data definition acquiring module configured to acquire data definition, where the data definition is generated in response to definition of the user interface; a data acquiring module configured to acquire data from data sources based on the data definition; a data processing module configured to process the acquired data based on the data definition; and a caching module configured to cache the processed data.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and conveying the scope of the present disclosure to those skilled in the art.

With certain embodiments, when designing a user interface for performance monitoring, the corresponding data definition is generated dynamically based on a user interface definition. Depending on design of a performance monitoring system, the performance monitoring system may acquire the data definition in advance and collect the running data of an application based on the data definition and store the data in a cache. When a user loads the user interface for performance monitoring, since running data corresponding to that user interface has already been stored in the cache in advance, the display speed can be greatly improved and certain problems in the art are effectively solved. Thus, certain embodiments recognize one or more defects in the art, and provide a technical solution for overcoming the one or more defects in the art.

Figure 1:
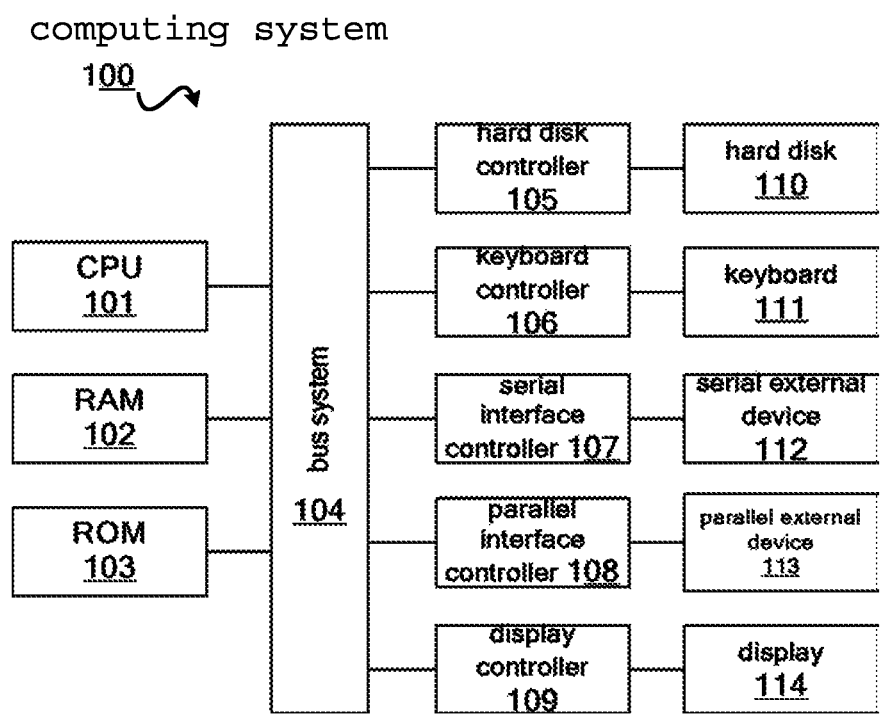
FIG. 1 shows a block diagram of a computer system which is applicable to implement certain embodiments.

FIG. 1 shows a block diagram of an exemplary computer system 100 which is applicable to implement certain embodiments. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. The Display 114 is coupled to Display Controller 109. It should be understood that the structure as shown in FIG. 1 is an example, rather than any limitation on the embodiments. In some cases, some devices may be added to or removed from the computer system 100 based on specific situations.

As will be appreciated by one skilled in the art, aspects of certain embodiments may be embodied as a system, method or computer program product. Accordingly, aspects of certain embodiments may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects certain embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present embodiments may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a registered trademark or trademark of Oracle and/or its affiliates.

Aspects of certain embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
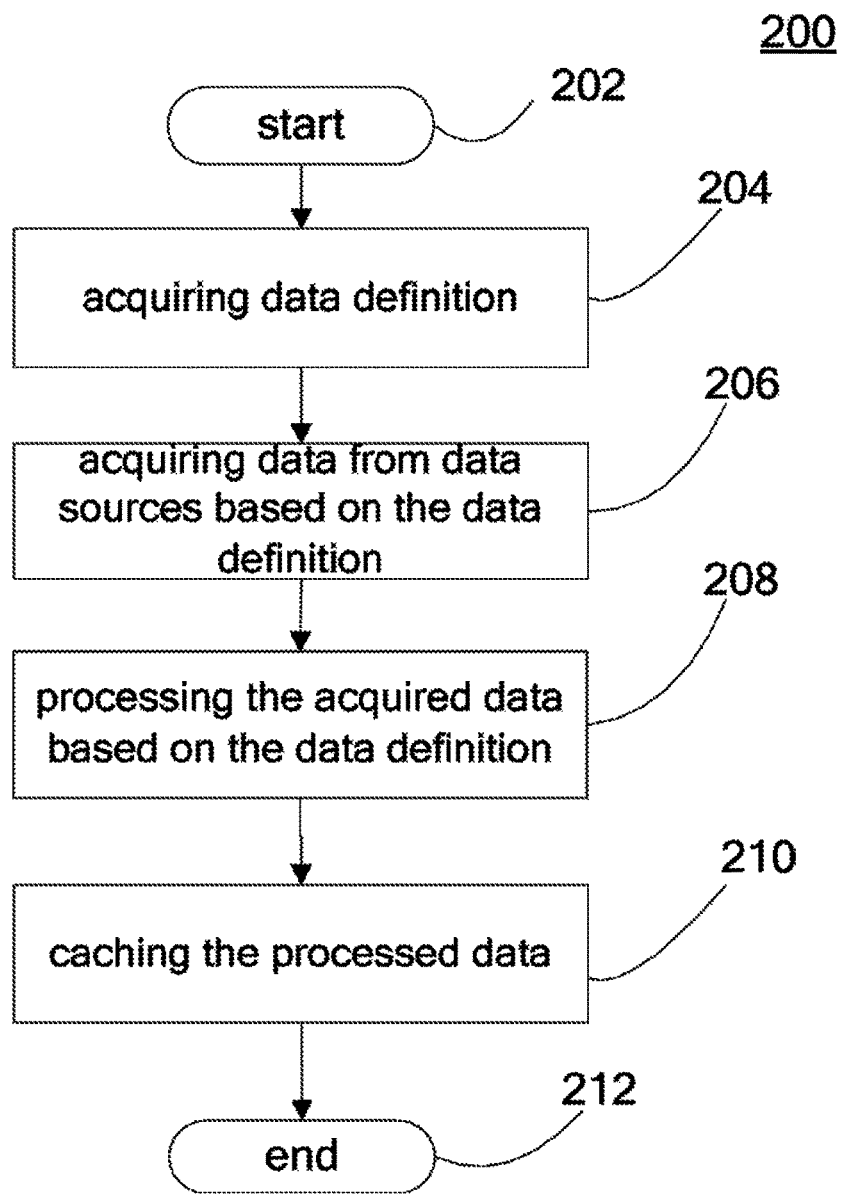
FIG. 2 shows a flowchart of a method for providing data to a user interface for performance monitoring according to certain embodiments.

With reference now to FIG. 2, in which a flowchart of a method 200 for providing data to a user interface for performance monitoring according to certain embodiments is shown.

According to an embodiment, the method 200 for providing data to a user interface for performance monitoring starts with step 202. Next, the method 200 proceeds to step 204, which comprises: acquiring data definition which is generated in response to definition of the user interface.

As mentioned earlier, when performance monitoring is conducted on an application system, a method employed is to directly extract data related to running indices through a user interface during operation of the application and then calculate the desired running indices according to the extracted data. In contrast to the above, according to embodiments, the user interface does not directly extract data related to running indices; instead, it generates data definition in response to definition of the user interface. User interface refers to a user interface for displaying, analyzing data related to running indices of the monitored application system and/or for performing relevant resource management in a performance monitor system. Definition of user interface refers to defining a user interface by relevant personal of the performance monitoring system. Definition of user interface may be made dynamically based on user's demand. An example of user interface definition is as follows:

```
<UI name="Database lock summary">
    <field 1 ><label: DB1 deadlock><VAR1>
    <field 2 ><label: DB2 deadlock><VAR2>
    <field 3 ><label: Total deadlock><VAR3>
    <data set: DataSet1> <source: hostname>
      <VAR1, raw><source.DBinstance2.lock_number>
      <VAR2, raw><source.DBinstance1.lock_number>
      <VAR3, derived><formula: VAR1+VAR2>
    </data set>
    <refresh rate: every 3 min >
</UI>
```

In the above user interface definition, name of the user interface is Database lock summary, which has three display regions, i.e. field 1, field 2 and field 3, corresponding tags thereof are DB1 deadlock, DB2 deadlock and Total deadlock respectively, and corresponding variable names thereof are VAR1, VAR2 and VAR3. Refresh rate of data is every 3 minutes. Data set is DataSet1.

The data definition generated in response to definition of the user interface specifies data sources from which data is to be acquired and types of operation that need to be performed on the acquired data. Alternatively, the data definition may also specify frequency at which data is acquired from data sources and the manner of displaying the acquired data etc. The data definition generated in response to definition of the user interface is as follows:

```
<dataset name="DB2 lock summary", ID=DataSet1>
    <VAR1, raw><source.DBinstance1.lock_number>
    <VAR2, raw><source.DBinstance2.lock_number>
    <VAR3, derived><formula: VAR1+VAR2>
    <refresh rate: every 3 min >
<UI name="Database lock summary">
```

In the above data definition generated in response to definition of the user interface, the following content are specified respectively:
1) variable VAR1 in user interface definition: raw data, corresponding data source from which data is to be acquired is DBinstance1.lock_number;
2) variable VAR2 in user interface definition: raw data, corresponding data source from which data is to be acquired is DBinstance2.lock_number;
3) variable VAR3 in user interface definition: derived data, corresponding to sum of variables VAR1 and VAR2;
4) refresh rate of data is every 3 minutes;
5) corresponding name of user interface is Database lock summary.

It should be appreciated that, the above examples are merely for purpose of illustration, and should not be regarded as limitation on the claims. In practice, user interface definition and data definition generated in response to definition of the user interface may use any other suitable formats in the art.

Next, the method 200 proceeds to step 206, which comprising: acquiring data from data sources based on the data definition. According to certain embodiments, acquiring data from data sources based on the data definition comprises: analyzing the data definition to obtain data sources from which data is to be acquired. Here, still taking the above data definition for example, it may be obtained by analyzing the data definition that, data to be acquired are 1) VAR1: raw data, corresponding data source from which data is to be acquired is DBinstance1.lock_number; 2) VAR2: raw data, corresponding data source from which data is to be acquired is DBinstance2.lock_number; and 3) VAR3: derived data, corresponding to sum of variables VAR1 and VAR2. That is, data sources from which data is to be acquired are: DBinstance1.lock_number and DBinstance2.lock_number respectively. According to an embodiment, acquiring data from data sources based on the data definition further comprises: generating commands for acquiring data from the data sources; and sending the generated commands. Here, again taking the above data definition for example, corresponding to the obtained data sources DBinstance1.lock_number and DBinstance2.lock_number that are needed, corresponding commands for acquiring data are generated respectively and the generated commands are sent to the data sources.

Next, the method 200 proceeds to step 208, which comprising: processing the acquired data based on the data definition. According to an embodiment, processing the acquired data based on the data definition further comprises: analyzing the data definition to obtain types of operation that need to be performed on the acquired data; and processing the acquired data based on the obtained types of operation that need to be performed on the acquired data. Here, still taking the above data definition for example, it may be obtained by analyzing the data definition that, types of operation that need to be performed on the acquired data are 1) assign the obtained raw data corresponding to variable VAR1 to variable VAR1; 2) assign the obtained raw data corresponding to variable VAR2 to variable VAR2; and 3) sum raw data corresponding to the variable VAR1 and raw data corresponding to the variable VAR2 and assign the result to VAR3, i.e. VAR3=VAR1+VAR2. Then, corresponding processing is conducted on the acquired data based on the obtained types of operation that need to be performed on the acquired data, respectively. That is, 1) assign the obtained raw data corresponding to variable VAR1 to variable VAR1; 2) assign the obtained raw data corresponding to variable VAR2 to variable VAR2; and 3) sum raw data corresponding to the variable VAR1 and raw data corresponding to the variable VAR2 and assign the result to VAR3, i.e. VAR3=VAR1+VAR2.

Next, the method 200 proceeds to step 210, which comprising: caching the processed data. Corresponding to the above example, here, caching the processed data comprises caching VAR1, VAR2 and VAR3.

Next, the method 200 proceeds to step 212 and ends.

According to certain embodiments, the method 200 for providing data to a user interface for performance monitoring may further comprise: providing the cached data to the user interface in response to a request of the user interface. During operation of the performance monitor system of the application system, a request will be generated in response to loading of the user interface, the request comprises data request corresponding to the data definition generated in response to definition of the user interface. According to an embodiment, the method 200 for providing data to a user interface for performance monitoring may further comprise: allocating an identifier to the acquired data definition. After data definition is acquired, the acquired data definition may be allocated an identifier that can uniquely identify that data definition. According to an embodiment, the cached data is provided to the user interface by using the identifier in response to a request of the user interface.

Several embodiments of the method for providing data to a user interface for performance monitoring have been described above in detail in conjunction with FIG. 2. With the above one or more embodiments, when designing a user interface for performance monitoring, corresponding data definition is generated dynamically based on user interface definition. The performance monitor system may acquire the data definition in advance and collect running data of application based on the data definition and store the data in a cache. When a user loads the user interface for performance monitoring, since running data corresponding to that user interface has already been stored in the cache in advance, display speed can be greatly improved and the above problems in the art are effectively solved. It should be appreciated that, the description of user interface definition, data definition and so on are merely illustrative, and should not be regarded as limiting the claims.

Figure 3:
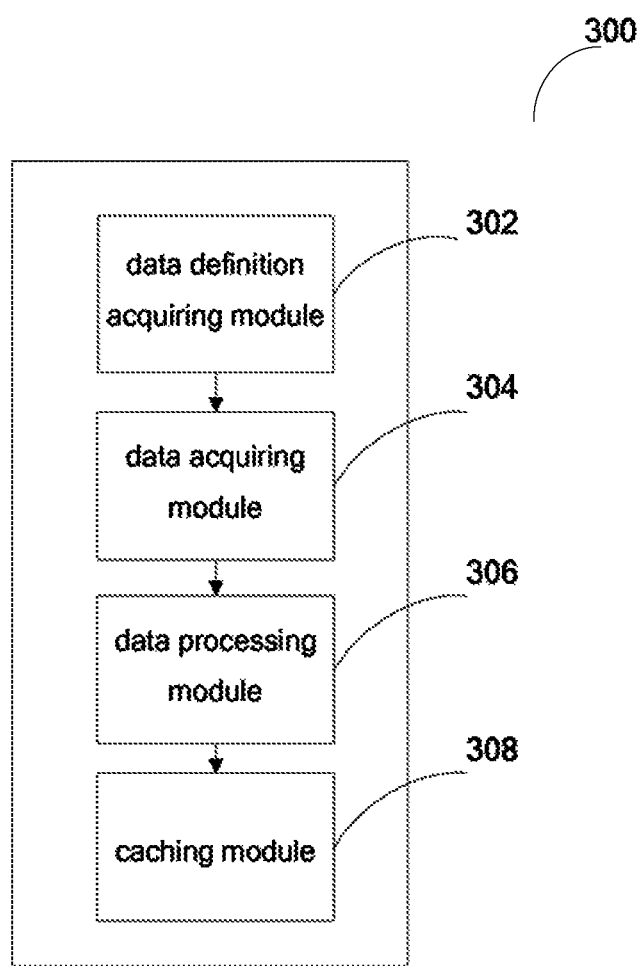
FIG. 3 shows a block diagram of a system for providing data to a user interface for performance monitoring according to certain embodiments.

With reference now to FIG. 3, in which a block diagram of a system 300 for providing data to a user interface for performance monitoring according to certain embodiments is shown.

According to an embodiment, the system 300 for providing data to a user interface for performance monitoring comprises: a data definition acquiring module 302 configured to acquire data definition which is generated in response to definition of the user interface; a data acquiring module 304 configured to acquire data from data sources based on the data definition; a data processing module 306 configured to process the acquired data based on the data definition; and a caching module 308 configured to cache the processed data.

According to an embodiment, the data acquiring module 304 is further configured to analyze the data definition to obtain data sources from which data is to be acquired. According to an embodiment, the data acquiring module 306 is further configured to generate commands for acquiring data from the data sources; and send the generated commands.

According to an embodiment, the data processing module 306 is further configured to analyze the data definition to obtain types of operation that need to be performed on the acquired data; and process the acquired data based on the obtained types of operation that need to be performed on the acquired data.

According to an embodiment, the system 300 for providing data to a user interface for performance monitoring further comprising: a data providing module configured to provide the cached data to the user interface in response to a request of the user interface. According to an embodiment, the data providing module is further configured to allocate an identifier to the acquired data definition; and provide the cached data to the user interface by using the identifier.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing data to a user interface for performance monitoring, the method comprising:
  acquiring, by a data definition acquiring module executing in a computer system, a data definition, wherein the data definition is generated in response to a definition of the user interface;
  acquiring, by a data acquiring module executing in the computer system, data from data sources based on the data definition;
  processing, by a data processing module executing in the computer system, the acquired data based on the data definition;
  caching, by a caching module executing in the computer system, the processed data in a cache, wherein the data definition specifies a frequency at which the data is acquired from the data sources and a manner of displaying the acquired data.

2. The method of claim 1, wherein the data definition specifies data sources from which data is to be acquired and types of operation to be performed on the acquired data.

3. The method of claim 2, wherein the acquiring of data from data sources based on the data definition further comprises:
  analyzing the data definition to obtain data sources from which data is to be acquired.

4. The method of claim 2, the method further comprising:
  generating commands for acquiring data from the data sources; and
  sending the generated commands.

5. The method of claim 2, wherein the processing of the acquired data based on the data definition further comprises:
  analyzing the data definition to obtain types of operation that need to be performed on the acquired data; and
  processing the acquired data based on the obtained types of operation that need to be performed on the acquired data.

6. The method of claim 1, the method further comprising:
  providing the cached data to the user interface in response to a request of the user interface.

7. The method of claim 1, the method further comprising:
  allocating an identifier to the acquired data definition, wherein the providing of the cached data in response to a request of the user interface further comprises providing the cached data to the user interface by using the identifier.

8. A system for providing data to a user interface for performance monitoring, the system comprising:
  a memory; and
  a processor coupled to the memory, wherein the processor performs operations, the operations comprising:
    acquiring, by a data definition acquiring module executing in a computer system, a data definition, wherein the data definition is generated in response to a definition of the user interface;

acquiring, by a data acquiring module executing in the computer system, data from data sources based on the data definition;

processing, by a data processing module executing in the computer system, the acquired data based on the data definition;

caching, by a caching module executing in the computer system, the processed data in a cache, wherein the data definition specifies a frequency at which the data is acquired from the data sources and a manner of displaying the acquired data.

9. The system of claim 8, wherein the data definition specifies data sources from which data is to be acquired and types of operation to be performed on the acquired data.

10. The system of claim 9, wherein the acquiring of data from data sources based on the data definition further comprises:

analyzing the data definition to obtain data sources from which data is to be acquired.

11. The system of claim 9 the operations further comprising:

generating commands for acquiring data from the data sources; and sending the generated commands.

12. The system of claim 9, wherein the processing of the acquired data based on the data definition further comprises:

analyzing the data definition to obtain types of operation that need to be performed on the acquired data; and processing the acquired data based on the obtained types of operation that need to be performed on the acquired data.

13. The system of claim 8, the operations further comprising:

providing the cached data to the user interface in response to a request of the user interface.

14. The system of claim 8, the operations further comprising:

allocating an identifier to the acquired data definition, wherein the providing of the cached data in response to a request of the user interface further comprises providing the cached data to the user interface by using the identifier.

15. A computer readable storage medium for providing data to a user interface for performance monitoring, wherein code stored in the computer readable storage medium when executed by a processor performs operations, the operations comprising:

acquiring, by a data definition acquiring module executing in a computer system, a data definition, wherein the data definition is generated in response to a definition of the user interface;

acquiring, by a data acquiring module executing in the computer system, data from data sources based on the data definition;

processing, by a data processing module executing in the computer system, the acquired data based on the data definition;

caching, by a caching module executing in the computer system, the processed data in a cache, wherein the data definition specifies a frequency at which the data is acquired from the data sources and a manner of displaying the acquired data.

16. The computer readable storage medium of claim 15, wherein the data definition specifies data sources from which data is to be acquired and types of operation to be performed on the acquired data.

17. The computer readable storage medium of claim 16, wherein the acquiring of data from data sources based on the data definition further comprises:

analyzing the data definition to obtain data sources from which data is to be acquired.

18. The computer readable storage medium of claim 16, the operations further comprising:

generating commands for acquiring data from the data sources; and sending the generated commands.

19. The computer readable storage medium of claim 16, wherein the processing of the acquired data based on the data definition further comprises:

analyzing the data definition to obtain types of operation that need to be performed on the acquired data; and processing the acquired data based on the obtained types of operation that need to be performed on the acquired data.

20. The computer readable storage medium of claim 15, the operations further comprising:

providing the cached data to the user interface in response to a request of the user interface; and allocating an identifier to the acquired data definition, wherein the providing of the cached data in response to a request of the user interface further comprises providing the cached data to the user interface by using the identifier.

* * * * *